United States Patent [19]

Schreiber et al.

[11] 3,963,666

[45] June 15, 1976

[54] STORAGE-STABLE, QUICK-CURING EPOXIDE RESIN MOULDING MATERIALS

[75] Inventors: Bruno Schreiber; Wolfgang Seiz, both of Basel; Ewald Forster, Binningen, all of Switzerland

[73] Assignee: Ciba-Geigy Corporation, Ardsley, N.Y.

[22] Filed: Apr. 24, 1975

[21] Appl. No.: 571,143

Related U.S. Application Data

[63] Continuation of Ser. No. 257,749, May 30, 1972, abandoned.

[30] Foreign Application Priority Data

June 15, 1971 Switzerland.......................... 8703/70

[52] U.S. Cl........................ 260/37 EP; 260/47 EN
[51] Int. Cl.².......................................... C08L 63/00
[58] Field of Search..................... 260/37 EP, 47 EN

[56] References Cited
UNITED STATES PATENTS

| 3,288,747 | 11/1966 | Sussman........................... 260/37 EP |
| 3,409,591 | 11/1968 | Landua et al................ 260/37 EP X |

FOREIGN PATENTS OR APPLICATIONS

| 1,204,224 | 9/1970 | United Kingdom............ 260/47 EN |

OTHER PUBLICATIONS
The Condensed Chemical Dictionary; Reinhold Publishing Corp.; 1966; pp. 37, 38, 1020.

*Primary Examiner*—Lewis T. Jacobs
*Attorney, Agent, or Firm*—Vincent J. Cavalieri

[57] ABSTRACT

The invention relates to storage-stable, quick-curing epoxide resin moulding materials containing:

a. pre-adducts containing aromatic constituents and free epoxide groups and formed from epoxide resins and polyamines, b. pre-adducts containing free amino groups and formed from polyamines containing cycloaliphatic or heterocyclic groups with polyglycidyl compounds, as curing agents, and c. mineral or organic pulverulent or fibrous fillers, with the epoxide resin pre-adducts and the curing agents softening between 45° and 120°C, and melting 5° to 30°C above the softening point, and the resin pre-adducts and the curing agents being present in the moulding materials predominantly in the form of particles separated from each other.

The moulded articles are distinguished by very good stability to solar and UV rays, and retain their original colour to a very considerable extent even after prolonged irradiation.

14 Claims, No Drawings

STORAGE-STABLE, QUICK-CURING EPOXIDE RESIN MOULDING MATERIALS

This is a continuation of application Ser. No. 257,749 filed on May 30, 1972, now abandoned.

The invention relates to storage-stable, quick-curing epoxide resin moulding materials which contain epoxide resin pre-adducts containing solid aromatic constituents, solid amine curing agent — pre-adducts, optionally lubricants, and also fillers.

Moulding materials made from epoxide resins based on bisphenol A or on other bis- or polyphenols and epichlorohydrin, which contain aromatic amines as curing agents, are distinguished by easy mouldability and good mechanical properties of the cured moulding material; the field of application for these moulding materials is therefore very large. However, for some applications in electrical engineering, their arc resistance and tracking resistance are inadequate. According to M. J. Billings; I.E.E. 32C79-71, and G. M. L. Sommermann: Transactions of American Institute of Electrical Engineers 7, 967 (1960), the said disadvantage is attributable to the fact that, at the temperatures prevailing under high electrical loading or in the electric arc, aromatic compounds are converted, completely or partially, into graphite, which is electrically conducting and thus the cause of the ultimate complete destruction of the material.

This deficiency has been made good in that, in the formulation of moulding materials, the use of polyglycidyl ethers from bisphenol-A, or from other di- or polyphenols, has been completely dispensed with: thus, moulding materials made from triglycidylisocyanurate with anhydride curing agents (Swiss Pat. No. 493,583), or triglycidylisocyanurate with cycloaliphatic amines (Belgian Patent No. 720,286, Swiss Pat. No. 459,563), have been described.

The products are, however, expensive and not so readily accessible as, e.g. the epoxide resins from epichlorohydrin and bisphenol-A, or epichlorohydrin and phenol-formaldehyde condensation products, which are today produced commercially on a very large scale. The advantage offered by the said products with regard to the obtained high tracking and arc resistance of the cured material is, however, accompanied by certain disadvantages, such as, e.g. a higher level of water absorption.

Surprisingly, the new moulding materials according to the invention do not have these disadvantages. The new storage-stable, quick-curing epoxide resin moulding materials are characterised in that they contain:

a. pre-adducts containing aromatic constituents and free epoxide groups and formed from epoxide resins and polyamines, b. pre-adducts containing free amine groups and formed from polyamines containing cycloaliphatic or heterocyclic groups with polyglycidyl compounds, as curing agents, and c. mineral or organic pulverulent or fibrous fillers, with the epoxide resin preadducts and the curing agents softening between 45° and 120°C, and melting at 5° to 30°C above the softening point, and the resin preadducts and also the curing agents being present in the moulding materials predominantly in the form of particles separated from each other. It is preferably for the moulding materials to also contain lubricants.

The new moulding materials are produced according to the invention by a process in which a polyamine containing cycloaliphatic or heterocyclic groups and a polyglycidyl compound are reacted together in such amounts that the ratio of the number of reactive hydrogen atoms on the amine nitrogen atoms to that of the epoxide groups is in the range of 3 : 1 to 5 : 1, advantageously between 3.5 : 1 and 4.5 : 1; the formed curing agent pre-adduct, which has a softening point in the range of 45° to 120°C and a melting point higher than the softening point by 5°–30°C, is then mixed together with a pre-adduct, containing free epoxide groups, of an epoxide resin with a polyamine, the epoxide resin pre-adduct containing aromatic constituents, softening between 45° and 120°C, and possessing a melting point 5°–30°C above the softening point, also with fillers and, optionally, with a lubricant; and the mixture subsequently ground, whereby there occurs to a slight degree at the most a fusing together of the particles of the resin pre-adduct and those of the curing agent pre-adduct.

The epoxide resin pre-adducts can be produced from initially liquid or semi-liquid products which have been converted by a preliminary chain-lengthening reaction into the solid resinous state; the said pre-adducts are preferably produced from products of a reaction between a low-molecular bisphenol-A epoxide resin having at least two epoxide group equivalents/kg, particularly more than 4.5 equivalents/kg, with less than an equivalent amount of a diamine such as 4,4'-diaminodiphenylmethane, 4,4'-diaminodicyclohexylmethane, etc.

Suitable curing agents are various solid products obtained by a preliminary chain-lengthening reaction of cycloaliphatic or heterocyclic polyamines, especially diamines, with less than an equivalent amount of a low-molecular polyglycidyl compound. Various amino compounds can be used for the production of these curing agent pre-adducts: 1,2-, 1,3- or 1,4-diaminocyclohexane, 3-aminomethyl-3,5,5-trimethylcyclohexylamine, 4,4'-diaminodicyclohexylmethane, 4,4'-diaminodicyclohexylpropane, 4,4'-diamino-3,3'-dimethyldicyclohexylmethane and other polyaminodicycloalkylalkanes, also polyaminoheterocyclic compounds such as N-aminoethylpiperazine and 2,3-dimethyl-3-aminopropylpiperidine, etc.

Suitable as a reactant for the preliminary reaction is an amount less than the equivalent amount of, e.g. bisphenol-A epoxide resin, diglycidyl esters of cycloaliphatic or heterocyclic dicarboxylic acids (1,2-, 1,3- or 1,4-dicarboxylic acid, etc.), N,N-anilinediglycide, N,N-cyclohexylaminediglycide, or other diglycidyl compounds forming with amines at temperatures up to 200°C a solid product.

The curing agent component from amine with less than an equivalent amount of epoxide resin is produced, preferably in the absence of solvents, either by a process in which the amino compound is placed into the reaction vessel at temperatures of generally between 50° and 200°C, preferably between 120° and 170°C, with the polyglycidyl compound being then mixed in portionwise or continuously, or by a process in which the two basic components are continuously mixed and caused to react in a suitable reaction vessel heated to 200°C. The preliminary chain-lengthening reaction proceeds under these conditions practically quantitatively, and enables intermediates to be obtained which are very stable in storage and in light.

The preliminary chain-lengthening reaction corresponds, for example, approximately to the following reaction pattern:

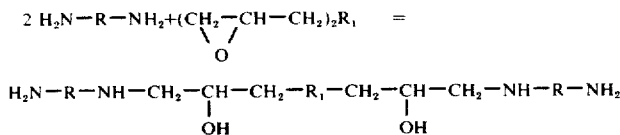

$$2\, H_2N-R-NH_2 + (CH_2-\overset{\vphantom{O}}{CH}-CH_2)_2 R_1 \;\;=$$
$$\underset{O}{\underbrace{\phantom{CH_2-CH-CH_2}}}$$

$$H_2N-R-NH-CH_2-\underset{OH}{CH}-CH_2-R_1-CH_2-\underset{OH}{CH}-CH_2-NH-R-NH_2$$

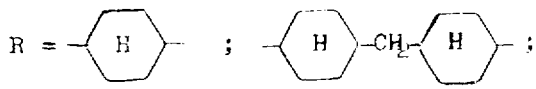

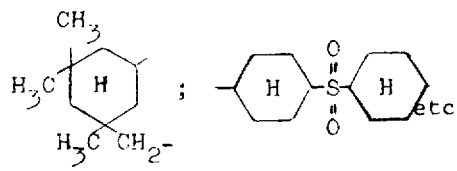

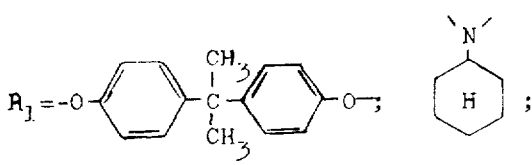

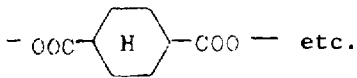

The ratio between amino and epoxide groups in the mixture is in the range of 1.5–2.5, mostly between 1.75 and 2.25, and accordingly leads to products with differing softening points being obtained.

The following may be used as fillers: quartz flour, ground shale, calcined kaolin, powdered chalk, wallastonite, mica, aluminium oxide trihydrate, diopside, ground dolomite, talcum, barium sulphate, etc.; also such materials which simultaneously serve as toughening agents, such as asbestos, glass, carbon and boron fibres, organic fibres, e.g. wood flour, cellulose, polyamide, polyester, polyacrylonitrile, etc. It is also possible to use mixtures of such fillers. Suitable lubricants are, e.g.: stearates such as magnesium, calcium and zinc stearate, stearic acid, bees wax, carnauba wax, paraffin and synthetic waxes, e.g. based on polyethylene or on silicone. The moulding materials can additionally contain further solid epoxide resins.

The moulding materials can be produced as follows:

The adduct produced with an excess of epoxide resin and with cycloaliphatic and aromatic amines is mixed, with the addition of inorganic or organic fillers and, optionally, lubricants and accelerators, with the aid of a ball mill or similar equipment, which enables a grinding and thorough mixing of the constituents of the moulding materials to be performed, without more than a superficial fusing together of the particles of the resin and curing agent occurring during this mixing and grinding operation. The resin and curing agent are therefore present in the finished moulding material mainly in the form of separate particles; blending together and reaction do not take place until melting occurs under the action of heat and pressure in the press or screw injection moulding machine used for processing. The obtained fine pulverulent product is finely granulated and further processed. The increased reactivity of the cycloaliphatic amines employed in this case, compared with that of the aromatic amines, has the advantageous effect of reducing the moulding times. Compared with the moulding materials which are based on B-stages and formed from low-molecular polyglycidyl ethers of, e.g. bisphenol A and aromatic polyamines, the epoxide resin moulding materials according to the invention have the advantage of better stability in storage. They are also more storage-stable than the moulding materials described in the Swiss Pat. No. 487,835 and produced by the B-stage process from liquid epoxide resin and likewise from the isophoronediamine adduct. The same applies in the case of a comparison with moulding materials prepared from triglycidylcyanurate or triglicidylisocyanurate and cycloaliphatic polyamines according to the Swiss Pat. No. 459,563. A further advantage compared with these moulding materials is the appreciably lower tendency of the new moulding materials to give rise to exudation. In comparison with the moulding materials based on triglycidylisocyanurate according to the Swiss Pat. No. 493,583 and the Belgian Pat. No. 720,286, which are likewise resistant to arcing and tracking, the moulding materials according to the invention are distiguished by more rapid curing, also by a lower water absorption, especially in boiling water, and by better dielectric properties of the cured moulding materials.

The reduction in the content of aromatic constituents, compared with that in the case of similar products cured with aromatic amines, leads to a considerable improvement in the value obtained for tracking and arc resistance. Thus, the arc resistance values measured by the KA process (DIN 53480, July 1964) are improved from the original KA 1 to KA 2 to KA 3b to KA 3c. Furthermore, the values obtained for arc resistance according to ASTM in the case of the moulding materials according to the invention. filled with the usual fillers, are mostly above 180 sec.

The moulded articles are distinguished by very good stability to solar and UV rays, and retain their original colour to a very considerable extent even after prolonged irradiation.

PRODUCTION OF CURING AGENTS

ADDUCT A

An amount of 476.8 g (2 moles) of 4,4'-diamino-3,3'-dimethyldicyclohexylmethane is placed into a 1-liter reaction vessel and heated to 130°C. During ca. 30 minutes, 284.3 g (1 mole) of diglycidyl ester of 1,2-cyclohexanedicarboxylic acid is mixed in, and the

| Properties: | softening point | : | 60°C, |
|---|---|---|---|
| | melting point | : | 73°C, |
| | amino group equivalents/kg | : | 5.94. |

ADDUCT B

An amount of 420.7 g (2 moles) of 4,4'-diaminodicyclohexylmethane is mixed together in a 1-liter reaction vessel with 374.5 g of bisphenol-A-epoxide resin (5.3 epoxide group equivalents/kg), and the mixture heated for 1 hour to 130°C. After 1 hour of additional heating, the viscous product is cooled and ground.

| Properties: | softening point | : | 66°C, |
|---|---|---|---|
| | melting point | : | 78°C, |
| | amino group equivalents/kg | : | 3.71 |

ADDUCT C 4,4'-Diamino-3,3'-dimethyldicyclohexylmethane is premixed with a low-molecular bisphenol-A-epoxide resin (5.34 epoxide group equivalents/kg) in the molar ratio of 2 : 1; the mixture is continuously proportioned out in a screw reactor heated to 150°C, and the obtained solid product ground.

| Properties: | softening point | : | 59°C, |
|---|---|---|---|
| | melting point | : | 70°C, |
| | amino group equivalents/kg | : | 3.52. |

ADDUCT D

An amount of 1142 g (10 moles) of 1,2-diaminocyclohexane is placed into a 5-liter reaction vessel; an addition is then made dropwise at 130°C during 60 minutes of 1026 g of N,N-anilinediglycide. After 30 minutes subsequent heating, the viscous product is cooled and ground.

| Properties: | softening point | : | 65°C, |
|---|---|---|---|
| | melting point | : | 79°C, |
| | amino group equivalents/kg | : | 6.50. |

ADDUCT E

An amount of 906 g (3.8 moles) of 4,4'-diamino-3,3'-dimethyldicyclohexylmethane is placed into a 2-liter reaction vessel and heated to 130°C. An addition is then made dropwise, in the course of 45 minutes, of 297 g (1 mole) of triglycidylisocyanurate in the melted form (120°C), and the added material mixed in. The product obtained after cooling is ground.

| Properties: | softening point | : | 70°C, |
|---|---|---|---|
| | melting point | : | 55°C, |
| | amino group equivalents/kg | : | 8.89. |

ADDUCT F

An amount of 340.6 g (2 moles) of 3-aminomethyl-3,5,5-trimethylcyclohexylamine is heated to 120°C in a 1-liter reaction vessel; with continuous stirring, an addition is then made dropwise during 30 minutes of 377.3 g of bisphenol-A-epoxide resin (5.3 epoxide group equivalents/kg), and the added material stirred in. The solid product obtained after cooling is ground.

| Properties: | softening point | : | 63°C, |
|---|---|---|---|
| | melting point | : | 78°C, |
| | amino group equivalents/kg | : | 4.18. |

ADDUCT G

An amount of 228.4 g of 1,2-diaminocyclohexane is placed into a 1-liter reaction vessel; and, at 130°C, 375 g of bisphenol-A epoxide resin (5.34 epoxide group equivalents/kg) added dropwise during 30 minutes and mixed in. After a further 30 minutes of additional heating, the product is cooled and ground.

| Properties: | softening point | : | 62°C, |
|---|---|---|---|
| | melting point | : | 78°C, |
| | amino group equivalents/kg | : | 4.97. |

ADDUCT H

An amount of 284.5 g of 1,3-bis-(aminoethyl)-cyclohexane is placed into a 1-liter reaction vessel heated to 120°C. With continuous stirring, 400 g of bisphenol-A-epoxide resin (epoxide equivalents/kg = 5.30) is added during 50 minutes and mixed in. The solid product obtained after cooling is ground.

| Properties: | softening point | : | 48°C, |
|---|---|---|---|
| | melting point | : | 58°C, |
| | amino group content | : | 4.2 NH$_2$ equiv./kg. |

ADDUCT I

An amount of 258.4 g of N-aminoethylpiperazine is heated in a 1-liter reaction vessel to 120°C. With continuous stirring, 395 g of bisphenol-A-epoxide resin (epoxide equiv./kg = 5.30) is added dropwise during 45 minutes and mixed in. The solid product, obtained after 30 minutes additional heating at 130°C and subsequent cooling, is then ground.

| Properties | softening point | : | 51°C, |
|---|---|---|---|
| | melting point | : | 62°C, |
| | amino group equivalents/kg | : | 4.4. |

ADDUCT K

An amount of 340 g of 2,3-dimethyl-3-aminopropyl-piperidine is heated in a 1-liter reaction vessel to 130°C. With continuous stirring, 390 g of bisphenol-A-epoxide resin (epoxide equivalents/kg = 5.35) is added dropwise during 45 minutes of additional heating and mixed in. The solid product, obtained after 30 minutes additional heating at 130°C, and subsequent cooling is ground.

| Properties: | softening point | : | 55°C, |
|---|---|---|---|
| | melting point | : | 68°C, |
| | amino group equiv./kg | : | 2.8. |

EXAMPLES OF PROCESSES FOR THE PRODUCTION OF RESIN ADDUCTS

EXAMPLE I

An amount of 1000 g of a liquid bisphenol-A epoxide resin having a content of 5.35 epoxide equivalents/kg, and a viscosity at 25°C of 13,500 cP (referred to in the following as resin A) is placed into a 2-liter reaction vessel, and heated in an oil bath to 140°C. In the course of 45 minutes, 100 g of 4,4'-diaminodiphenylmethane (10.00 $NH_2$/kg) is mixed in hot in the molten state (100°C). The rate of addition is so regulated that the temperature of the reaction mixture does not exceed 170°C. After a further 30 minutes heating at the same temperature, the obtained viscous liquid is cooled, and the light-yellow, resinous and brittle product ground.

| Properties of the product: | | |
|---|---|---|
| epoxide group equivalents/kg | | = 3.00, |
| softening point | (acc. to Kofler) | = 58°C, |
| melting point | (acc. to Kofler) | = 72°C. |

EXAMPLE II

An amount of 1000 g of epoxide resin A (see Example I) is placed into a 2-liter reaction vessel and heated to 115°C. In the course of 40 minutes, with continuous stirring, 115 g of 4,4'-diamino-3,3'-dimethyl-dicyclohexylmethane (8.4 $NH_2$/kg) is added dropwise at such a rate that the temperature of the mixture does not exceed 140°C. After a further 10 minutes of heating, the product is cooled and then ground.

| Properties: | epoxide group equivalents/kg | : | 3.06, |
|---|---|---|---|
| | softening point | : | 58°C, |
| | melting point | : | 73°C. |

EXAMPLE III

An amount of 500 g of an epoxidised phenolphthalein (epoxide equiv./kg = 4.15; softening point = 53°C) is melted in a 1-liter reaction vessel and heated to 140°C. In the course of 60 minutes, with continuous stirring, 20 g of 4,4'-diaminodiphenylmethane (10.00 amino group equivalents/kg) is added in the molten state at such a rate that the temperature of the mixture does not exceed 160°C. After a further 20 minutes of heating, the product is cooled and ground.

| Properties: | epoxide group equiv./kg | : | 3.2, |
|---|---|---|---|
| | softening point | : | 85°C, |
| | melting point | : | 97°C. |

EXAMPLES FOR THE PRODUCTION OF MOULDING MATERIALS

EXAMPLE 1

An amount of 83 g of a curing agent — adduct A is mixed together for 6 hours with 217 g of a solid resin adduct I having an epoxide content of 3.00 equiv./kg and a melting point of 72°C (produced from bisphenol A — epoxide resin with an amount less than the equivalent amount of 4,4'-diaminodiphenylmethane), with 690 g of quartz flour, 5 g of carnauba wax and 5 g of gas black in a 4.5-liter ball mill, and the mixture subsequently ground.

The obtained pulverulent moulding material is pressed into tablets or granulated, and processed at 150°C in a moulding tool by compression or injection moulding processes. The following values have been measured in tests on the obtained moulded specimens:

| | |
|---|---|
| flexural strength (DIN) | 950 kp/cm², |
| impact strength (DIN) | 8 kpcm/cm², |
| dimensional stability under heat according to Martens (DIN) | 115°C, |
| water absorption (DIN) | 8 mg, |
| electrical insulation resistance | 5 . $10^{15}$ ohm . cm, |
| loss factor (c.p.s.), tan δ | 0.007, |
| tracking resistance (VDE) | KA 3 c. |

EXAMPLE 2

An amount of 50 g of adduct E and 250 g of a solid adduct from bisphenol-A epoxide resin with less than the equivalent amount of 4,4'-diaminodiphenylsulphone (epoxide group equivalents/kg = 3.00, melting point = 75°C, softening point = 62°C) is ground and mixed with 300 g of talcum, 385 g of kaolin, 10 g of zinc stearate and 5 g of gas black in a 4.5-liter ball mill for 10 hours. The obtained moulding material is granulated and moulded in a mould for 10 minutes at 150°C.

| | |
|---|---|
| flexural strength (DIN) | 700 kp/cm², |
| impact strength | 6 kpcm/cm², |
| dimensional stability under heat according to Martens (DIN) | 120°C, |
| water absorption (DIN) | 12 mg, |
| electrical insulation resistance | 5 . $10^{14}$ ohm . cm, |
| loss factor (50 c.p.s.) tan δ | 0.015, |
| tracking resistance (VDE) | KA 3 c. |

EXAMPLE 3

An amount of 70 g of adduct G is mixed together with 230 g of a solid bisphenol-A epoxide resin obtained from a preliminary chain-lengthening operation with 4,4'-diaminodiphenylmethane (epoxide group equivalents/kg = 3, softening point = 75°C, melting point= 88°C), also with 693.0 g of calcined kaolin, 10 g of zinc stearate and 10 g of gas black in a 4.5-liter ball mill for 8 hours. The obtained pulverulent moulding material is granulated and processed as described in Example 1.

| flexural strength (DIN) | 1150 kp/cm², |
|---|---|
| impact strength (DIN) | 8 kpcm/cm², |
| dimensional stability under heat according to Martens (DIN) | 118°C, |
| water absorption (DIN) | 7 mg, |
| electrical insulation resistance | 5 . 10¹⁵ ohm . cm, |
| loss factor (50 c.p.s.), tanδ | 0.005, |
| tracking resistance (VDE) | KA 3 b. |

EXAMPLE 4

An amount of 77 g of adduct I is mixed together with a solid bisphenol-A epoxide resin obtained by a preliminary chain-lengthening reaction with 4,4'-diaminodiphenylmethane (resin adduct I), also with 40 g of glass fibre, 290 g of kaolin, 3 g of "OP Wax" (a partially esterified polyethylene wax of the firm Farbwerke Hoechst), 2 g of gas black and 5 g of titanium white in a 4.5 -liter ball mill for 15 hours. The obtained pulverulent epoxide moulding material is granulated and then further processed as described in Example 1.

| flexural strength (DIN) | 900 kp/cm², |
|---|---|
| impact strength | 7 kpcm/cm², |
| dimensional stability under heat according to Martens (DIN) | 110°C, |
| electrical insulation resistance | 5 . 10¹⁴ Ω. cm, |
| loss factor (50 c.p.s.) tan δ | 0.025, |
| tracking resistance (VDE) | KA 3 c. |

EXAMPLE 5

An amount of 88 g of curing agent adduct F is mixed and ground together with 242 g of the solid resin adduct I with epoxide equivalents/kg = 3.00 (produced from bisphenol-A epoxide resin with less than the equivalent amount of 4,4'-diaminodiphenylmethane), 663 g of calcined kaolin 20 g of "OP Wax" (a partially esterified polyethylene wax of the firm Farbwerke Hoechst) and 50 g of gas black for 6 hours in a 4.5-liter ball mill.

The storage stability of the product obtained according to Example 5 is compared with that of a product according to the Swiss Pat. No. 487,835. This comparison product is produced as follows:

An amount of 116.2 g of the curing agent adduct F is kneaded in a divided trough kneader with 213.8 g of liquid low-molecular bisphenol-A epoxide resin (epoxide equiv./kg = 5.30),663 g of kaolin (calc.), 20 g of "OP Wax" and 50 g of gas black for 20 minutes; the mixture is subsequently maintained for 24 hours at room temperature. The initially liquid mass transforms into a solid brittle state. The moulding materials are compared after a storage time at two different elevated temperatures, the comparison of storage stability being carried out by the spiral method. An IBM-spiral is used having a semicircular channel with a diametre of 3.17 mm, the pressure applied is 180 kg/cm². In the case of the product according to Example 5 and the comparison product, the following flow distances in inches are measured:

|  | Example 5 | Comp. product |
|---|---|---|
| Spiral flow (stage II) as such | 5⅝ inches | ⅝ inch |

-continued

|  | Example 5 | Comp. product |
|---|---|---|
| (tool temperature 150°C) | | |
| after 24 h/40°C | 5⅝ inches | 0 inch |
| after 24 h/50°C | 4½ inches | 0 inch |

The better values in the case of the moulding material according to the invention are obvious.

EXAMPLE 6

An amount of 196 g of the resin adduct I) from low-molecular bisphenol-A epoxide resin and 4,4'-diaminodiphenylmethane having an epoxide group content of 3.0 equivalents/kg is ground in a 4.5-liter ball mill with 64 g of the curing agent adduct C, 500 g of wollastonite, 230 g of aluminium oxide trihydrate, 5 g of "OP Wax" and 3 g of a pigment from burnt sienna and umber 1 : 1; grinding is carried out for 15 hours and the mixture then granulated. A quick-curing, storage-stable and, at the same time, noncombustible epoxide moulding material having very good tracking resistance is obtained.

| flexural strength (DIN) | 1050 kp/cm², |
|---|---|
| impact strength | 9.8 kpcm/cm², |
| dimensional stability under heat according to Martens | 126°C, |
| electrical insulation resistance | 8 . 10¹⁴ Ω . cm, |
| loss factor (50 c.p.s.) tan δ | 0.028, |
| tracking resistance (VDE) | KA 3 c, |
| arc resistance ASTM | 192 sec. |

EXAMPLE 7

An amount of 88 g of curing agent adduct F is mixed together with 250 g of calcined kaolin in a ball mill. In another ball mill (4.5 liters), 242 g of the solid resin adduct I having epoxide group equivalents/kg = 3.00 (produced from bisphenol-A epoxide resin with less than the equivalent amount of 4,4'-diaminodiphenylmethane) is ground together with 423 g of calcined kaolin, 2 g of "OP Wax" (see Example 5) and 5 g of gas black for 5 hours. The thus obtained preliminary mixtures are then placed in a ball mill and mixed together for a further 1 hour.

| flexural strength (DIN) | 1300 kp/cm², |
|---|---|
| impact strength (DIN) | 14 kpcm/cm², |
| dimensional stability under heat according to Martens (DIN) | 115°C, |
| electrical insulation resistance | 3 . 10¹⁵ ohm . cm, |
| loss factor (50 c.p.s.) tan δ | 0.01, |
| tracking resistance (VDE) | KA 3 c, |
| arc resistance (ASTM) | 190 sec. |

EXAMPLE 8

An amount of 64 g of curing agent adduct C is ground in a 4.5-liter ball mill for 8 hours together with 196 g of the solid resin adduct I (from bisphenol-A epoxide resin with less than the equivalent amount of 4,4'-diaminodiphenylmethane) having an epoxide group equivalent/kg = 3.00, with 500 g of "Wollastonite", 5 g of "OP Wax" and 3 g of gas black. An addition is then made into the same ball mill of 230 g of ground glass fibres, and the whole ground for a further 2 hours. The obtained product is subsequently granulated.

| | |
|---|---|
| flexural strength (DIN) | 1250 kp/cm², |
| impact strength (DIN) | 12.8 kp/cm², |
| dimensional stability under heat according to Martens (DIN) | 118°C. |
| electrical insulation resistance | 8 . 10¹⁴ ohm . cm. |
| loss factor (50 c.p.s.) tan δ | 0.009, |
| tracking resistance (VDE) | KA 3 c, |
| arc resistance (ASTM) | 188 sec. |

We claim:

1. Storage-stable, one package quick-curing epoxide resin moulding materials consisting essentially of:
   a. pre-adducts containing aromatic constituents and free epoxide groups and formed from epoxide resins and polyamines,
   b. pre-adducts containing free amino groups and formed from polyamines containing cycloaliphatic or heterocyclic groups with polyglycidyl compounds, as curing agents, wherein the ratio of the number of reactive hydrogen atoms of the polyamine on the amine nitrogen atoms to that of the epoxide groups of the epoxide is in the range of 3:1 to 5:1, and
   c. mineral or organic pulverulent or fibrous fillers, with the epoxide resin pre-adducts and the curing agents softening between 45° and 120°C, and melting 5° to 30°C above the softening point, and the resin pre-adducts and the curing agents being present in the moulding materials predominantly as discrete particles.

2. Epoxide resin moulding materials according to claim 1 which also contain lubricants.

3. Epoxide resin moulding materials according to claim 1 wherein the epoxide resin pre-adduct is an adduct from a low-molecular, glycidylated bisphenol A having an epoxide group content of at least 2 equivalents per kg of resin and a diamine.

4. Epoxide resin moulding materials according to claim 1 wherein the diamine is diaminodiphenylmethane.

5. Epoxide resin moulding materials according to claim 1 wherein the epoxide resin pre-adduct has an epoxide group content of more than 4.5 equivalents per kg.

6. Epoxide resin moulding material according to claim 1 containing
   a. 242 parts by weight of a solid resin adduct with epoxide group equivalents/kg = 3.00, softening point = 58°C, melting point = 72°C, produced from bisphenol-A epoxide resin with less than the equivalent amount of 4,4'-diamino-diphenylmethane,
   b. 88 parts by weight of a curing agent adduct with amino group equivalents/kg = 4.18, softening point = 63°C, melting point = 78°C, produced from 340.6 parts by weight of 3-aminomethyl-3,3,5-trimethylcyclohexylamine and 377.5 parts by weight of bisphenol-A-epoxide resin with 5.3 epoxide group equivalents/kg.
   c. 663 parts by weight of calcined kaolin,
   20 parts by weight of a partially esterified polymethylene wax and
   e. 50 parts by weight of gas black.

7. Epoxide resin moulding material according to claim 1 containing
   a. 196 parts by weight of a solid resin adduct with epoxide group equivalents/kg = 3.00, softening point = 58°C, melting point = 72°C, produced from bisphenol-A-epoxide resin with less than the equivalent amount of 4,4'-diamino-diphenylmethane,
   b. 64 parts by weight of a curing agent adduct with amino group equivalents/kg = 3.52, softening point = 59°C, melting point = 70°C, produced from 4,4'-diamino-3,3'-dimethyl-dicyclohexylmethane and a low molecular bisphenol-A-epoxide with 5.34 epoxide group equivalents/kg, in the molar ratio of 2:1,
   c. 500 parts by weight of wollastonite,
   d. 230 parts by weight of aluminium oxide trihydrate,
   e. 3 parts by weight of a partially esterified polymethylene wax and
   f. 3 parts by weight of a pigment from burnt sienna and umber 1:1.

8. Process for the production of storage-stable, quick-curing moulding materials, in which process a polyamine containing cycloaliphatic or heterocyclic groups and a polyglycidyl compound are reacted together in such amounts that the ratio of the number of the reactive hydrogen atoms on the amine nitrogen atoms so that of the epoxide groups is in the range of 3:1 to 5:1, the formed curing agent pre-adduct, which has a softening point within the range of 45° to 120°C and a melting point higher than the softening point by 5° to 30°C, is then mixed together with a pre-adduct, containing free epoxide groups, of an epoxide resin with a polyamine, the epoxide resin pre-adduct containing aromatic constituents, softening between 45° and 120°C, and possessing a melting point 5° to 30°C above the said softening point, and also with a filler; and the mixture subsequently ground, whereby there may occur to a slight degree at the very most a fusing together of the particles of the resin pre-adduct and those of the curing agent.

9. Process according to claim 8 wherein lubricants are also added.

10. Process according to claim 8, wherein the ratio of the number of reactive hydrogen atoms on the amino nitrogen atoms to that of the epoxide groups in the polyamine and in the polyglycidyl compound is, in the production of the curing agent pre-adduct, between 3,5 : 1 and 4.5 : 1.

11. Process according to claim 1, wherein the formation of the curing agent pre-adduct is effected in the absence of solvents, and at a temperature of between 50° and 200°C.

12. Process according to claim 8, wherein the formation of the curing agent pre-adduct is effected in the absence of solvents, and at a temperature of between 120° and 170°C.

13. Process according to claim 8, wherein the epoxide resin pre-adduct added for the production of the moulding materials is an adduct from a low-molecular, glycidylated bisphenol A having an epoxide group content of more than 3, particularly more than 4.5, equivalents/kg of resin, and a diamine.

14. Process according to claim 8, wherein the curing agent pre-adduct employed is an adduct from a cycloaliphatic or heterocyclic diamine with a low-molecular polyglycidyl compound.

* * * * *